(12) United States Patent
Taoka et al.

(10) Patent No.: US 9,184,811 B2
(45) Date of Patent: Nov. 10, 2015

(54) BASE STATION APPARATUS, MOBILE STATION APPARATUS AND CONTROL INFORMATION TRANSMISSION METHOD

(75) Inventors: Hidekazu Taoka, Tokyo (JP); Yoshihisa Kishiyama, Tokyo (JP); Nobuhiko Miki, Tokyo (JP); Katsutoshi Kusume, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 510 days.

(21) Appl. No.: 13/518,912

(22) PCT Filed: Jan. 5, 2011

(86) PCT No.: PCT/JP2011/050038
§ 371 (c)(1),
(2), (4) Date: Aug. 22, 2012

(87) PCT Pub. No.: WO2011/083796
PCT Pub. Date: Jul. 14, 2011

(65) Prior Publication Data
US 2012/0314667 A1 Dec. 13, 2012

(30) Foreign Application Priority Data
Jan. 6, 2010 (JP) .................................. 2010-001348

(51) Int. Cl.
| | |
|---|---|
| *H04B 7/04* | (2006.01) |
| *H04L 1/00* | (2006.01) |
| *H04L 1/18* | (2006.01) |
| *H04W 72/04* | (2009.01) |
| *H04B 7/06* | (2006.01) |

(52) U.S. Cl.
CPC ............ *H04B 7/0452* (2013.01); *H04L 1/0025* (2013.01); *H04L 1/1896* (2013.01); *H04B 7/0689* (2013.01); *H04W 72/042* (2013.01)

(58) Field of Classification Search
CPC ... H04L 5/0023; H04L 5/0048; H04L 5/0053; H04W 72/042; H04B 7/0452; H04B 7/0413
See application file for complete search history.

(56) References Cited

U.S. PATENT DOCUMENTS

| | | | |
|---|---|---|---|
| 2010/0303034 A1* | 12/2010 | Chen et al. ..................... | 370/329 |
| 2011/0019776 A1* | 1/2011 | Zhang et al. .................... | 375/340 |
| 2011/0033001 A1* | 2/2011 | Roh et al. ....................... | 375/260 |
| 2011/0103324 A1* | 5/2011 | Nam et al. ...................... | 370/329 |
| 2012/0127948 A1* | 5/2012 | Chung et al. ................... | 370/329 |

OTHER PUBLICATIONS

International Search Report w/translation from PCT/JP2011/050038 dated Feb. 8, 2011 (4 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

* cited by examiner

*Primary Examiner* — Jung Park
(74) *Attorney, Agent, or Firm* — Osha Liang LLP (57) ABSTRACT

The present invention is directed to preventing the load to be required for blind detection in a mobile station apparatus (UE) from increasing and switching between SU-MIMO and MU-MIMO dynamically, even in the event the system bandwidth is expanded. The present invention has a DCI format selection section (209) that selects identification information which identifies between a DCI format for SU-MIMO and a DCI format for MU-MIMO, a control signal generation section (210) that generates control signals including the identification information and including the DCI format for SU-MIMO or MU-MIMO, having the same number of bits, and a transmission section that transmits the control signals to a mobile station apparatus.

21 Claims, 8 Drawing Sheets

FIG. 1

| RB allocation | HARQ process number | MCS and HARQ for TB#1 | MCS and HARQ for TB#2 | RANK information | Other information | CRC |

BASE STATION APPARATUS, MOBILE STATION APPARATUS AND CONTROL INFORMATION TRANSMISSION METHOD

TECHNICAL FIELD

The present invention relates to a base station apparatus, a mobile station apparatus and a control information transmission method. More particularly, the present invention relates to a base station apparatus, a mobile station apparatus and a control information transmission method that support multi-antenna transmission.

BACKGROUND ART

In a UMTS (Universal Mobile Telecommunications System) network, for the purposes of improving frequency usage efficiency and improving the data rates, system features which are based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study.

In the third-generation mobile communication system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study (for example, LTE-Advanced (LTE-A)). For example, in LTE-A, there is a plan to expand the maximum system band for LTE specifications, which is 20 MHz, to approximately 100 MHz.

Also, in a system of the LTE scheme, a MIMO (Multi Input Multi Output) system is proposed (see, for example, non-patent literature 1), as a radio communication technique to transmit and receive data by a plurality of antennas and improve the data rate (frequency usage efficiency). In the MIMO system, a plurality of transmission/reception antennas are provided in the transmitter/receiver, so that different transmission information sequences are transmitted from different transmission antennas, at the same time. On the other hand, on the receiver side, taking advantage of the fact that fading variation is produced between transmission/reception antennas, by separating and detecting the information sequences that have been transmitted at the same time, it is possible to increase the data rate (frequency usage efficiency).

In a system of the LTE scheme, single-user MIMO (SU-MIMO), in which all the transmission information sequences that are transmitted from different transmission antennas are directed to the same user, and multiple-user MIMO (MU-MIMO), in which transmission information sequences that are transmitted from different transmission antennas are directed to different users, are defined. In the LTE system of Release 8 (Rel. 8), SU-MIMO and MU-MIMO are defined with different transmission modes, and are both defined with different downlink control channel (DCI (Downlink Control Information)) formats. For example, SU-MIMO is set in transmission mode 3 (open loop) and transmission mode 4 (closed loop), and MU-MIMO is set in transmission mode 5. The number of bits in the DCI format and information to be contained in the DCI format vary between these transmission modes. It is possible to switch between these transmission modes semi-statically.

Each transmission mode can be set in two DCI formats depending on usage. For example, in transmission mode 5, which corresponds to MU-MIMO, DCI formats 1D and 1A are defined. In the same transmission mode, it is possible to switch the DCI format dynamically. On the mobile station apparatus (UE) side, blind detection of the DCI format, which is selected in the base station apparatus, is performed. Consequently, as the number of DCI formats increases, the number of searches for blind detection increases. However, in the LTE system of Rel. 8, two DCI formats are allowed to be included for one transmission mode.

On the other hand, in the LTE system of Release 9 (Rel. 9), SU-MIMO and MU-MIMO, which use user-specific reference signals for demodulation (UE-specific RSs), are defined with the same DCI format (DCI format 2B). Consequently, in the LTE system of Rel. 9, SU-MIMO, in which the maximum number of transmitting streams is two, and MU-MIMO, in which the maximum number of users to multiplex is two, can be switched dynamically. Also, given that the transmission mode to include DCI format 2B includes, besides this, DCI format 1A alone, it is possible to maintain the number of searches for blind detection on the mobile station apparatus side the same number of times as in Rel. 8.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Now, as described above, in LTE-A, there is a plan to expand the maximum system bandwidth to approximately 100 MHz and increase the maximum number of transmission antennas to eight. Consequently, the number of streams or the number of space-multiplexed users to be supported is expected to increase compared to the LTE system of Rel. 9. Then, even in an environment where the number of streams or the number of space-multiplexed users to be supported increases in this way, there is possibly a demand to dynamically switch between and support SU-MIMO and MU-MIMO.

For example, as a technique to switch between SU-MIMO and MU-MIMO dynamically, it may be possible to increase the DCI formats to be defined for the same transmission mode (for example, three DCI formats) and increase the number of searches for blind detection in a mobile station apparatus. In this case, it is possible to increase the applicable range of DCI formats which can be selected, so that, even in an environment where the number of streams or the number of space-multiplexed users increases, it is possible to dynamically switch between and support SU-MIMO and MU-MIMO. However, upon increasing the number of searches for blind detection, there is a problem that the load to be required for blind detection in a mobile station apparatus increases significantly and the amount of operation processing in the mobile station apparatus increases.

The present invention has been made taking into account the above, and it is therefore an object of the present invention to provide a base station apparatus, a mobile station apparatus and a control information transmission method that can prevent the load to be required for blind detection in a mobile station apparatus from increasing and that can switch between SU-MIMO and MU-MIMO dynamically.

Solution to Problem

A base station apparatus according to the present invention has: an identification information selection section configured to select identification information which identifies between a DCI format for SU-MIMO and a DCI format for MU-MIMO; a control signal generation section configured to generate a control signal including the DCI format for SU-MIMO or MU-MIMO, including the identification information and having a same number of bits; and a transmission section configured to transmit the control signal to a mobile station apparatus.

According to this configuration, the DCI formats for SU-MIMO and MU-MIMO, which are included in control signals to be transmitted to a mobile station apparatus, have the same number of bits, so that it is possible to decode information of the DCI formats without increasing the number of searches for blind detection in the mobile station apparatus. Also, given that the DCI formats contain identification information to identify between the DCI format for SU-MIMO and the DCI format for MU-MIMO, it is possible to identify between the DCI formats for SU-MIMO and MU-MIMO reliably, and switch between SU-MIMO and MU-MIMO dynamically.

A mobile station apparatus according to the present invention has: a receiving section configured to receive, from a base station apparatus, a control signal including a DCI format for SU-MIMO or MU-MIMO, including the identification information which identifies between the DCI format for SU-MIMO and the DCI format for MU-MIMO and having a same number of bits; and a detection section configured to detect a type of the DCI format included in the control signal based on the identification information, and detect information that is included in the DCI format.

According to this configuration, the DCI formats for SU-MIMO and MU-MIMO, which are included in control signals received from a base station apparatus, have the same number of bits, so that it is possible to decode information of the DCI formats without increasing the number of searches for blind detection in a mobile station apparatus. Also, given that the DCI formats contain identification information to identify between the DCI format for SU-MIMO and the DCI format for MU-MIMO, it is possible to identify between the DCI formats for SU-MIMO and MU-MIMO reliably, and switch between SU-MIMO and MU-MIMO dynamically.

A control information transmission method according to the present invention has the steps of: at a base station apparatus: selecting identification information which identifies between a DCI format for SU-MIMO and a DCI format for MU-MIMO; generating a control signal including the DCI format for SU-MIMO or MU-MIMO, including the identification information and having a same number of bits; and transmitting the control signal; and at a mobile station apparatus: receiving the control signal; and detecting a type of the DCI format included in the control signal based on the identification information, and detecting information that is included in the DCI format.

According to this method, the DCI formats for SU-MIMO and MU-MIMO, which are included in control signals transmitted from a base station apparatus to a mobile station apparatus, have the same number of bits, so that it is possible to decode information of the DCI formats without increasing the number of searches for blind detection in the mobile station apparatus. Also, given that the DCI formats contain identification information to identify between the DCI format for SU-MIMO and the DCI format for MU-MIMO, it is possible to identify between the DCI formats for SU-MIMO and MU-MIMO reliably, and switch between SU-MIMO and MU-MIMO dynamically.

Technical Advantages of the Invention

According to the present invention, the DCI formats for SU-MIMO and MU-MIMO, which are included in control signals transmitted from a base station apparatus to a mobile station apparatus, have the same number of bits, so that it is possible to decode information of the DCI formats without increasing the number of searches for blind detection in the mobile station apparatus. Also, given that the DCI formats contain identification information to identify between the DCI format for SU-MIMO and the DCI format for MU-MIMO, it is possible to identify between the DCI formats for SU-MIMO and MU-MIMO reliably, and switch between SU-MIMO and MU-MIMO dynamically. As a result of this, even in the event the system bandwidth is expanded, it is possible to prevent the load to be required for blind detection in a mobile station apparatus (UE) from increasing, and switch between SU-MIMO and MU-MIMO dynamically.

DESCRIPTION OF EMBODIMENTS

Figure 1:
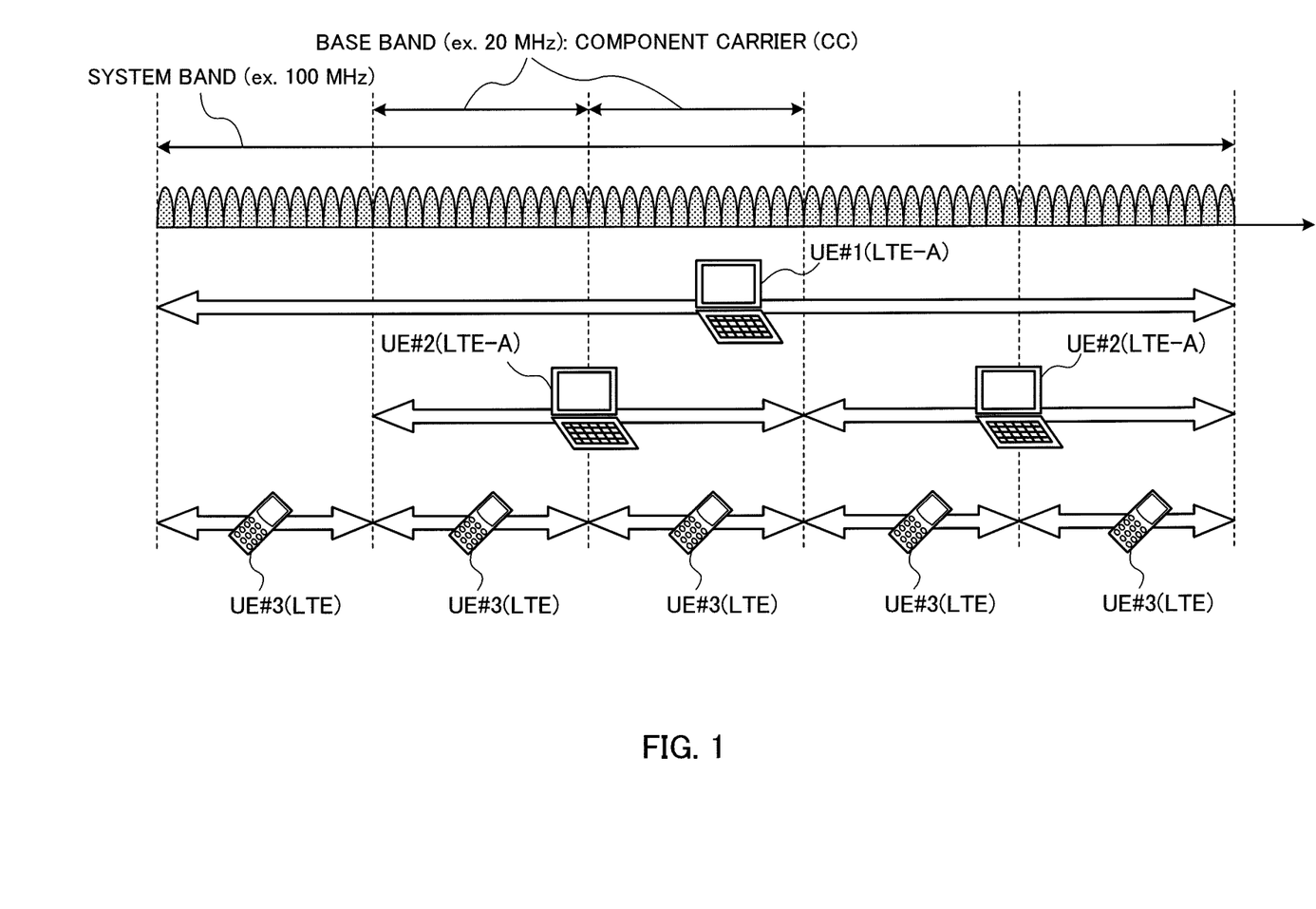
FIG. 1 is a diagram for explaining system bands in LTE and LTE-A systems.

FIG. 1 is a diagram for explaining system bands in LTE and LTE-A systems. The example of FIG. 1 illustrates a layered bandwidth configuration where an LTE-A system, which is the first mobile communication system having the first system band that is formed with a plurality of fundamental frequency blocks, and an LTE system, which is a second mobile communication system having a second system band that is formed with one fundamental frequency block, coexist. In the LTE-A system, for example, radio communication is performed in a variable system bandwidth of 100 MHz or below, and, in the LTE system, radio communication is performed in a variable system bandwidth of 20 MHz or below. The system band of the LTE-A system is at least one fundamental frequency block, where the system band of the LTE system is one unit. In LTE-A, a fundamental frequency block is referred to as a component carrier (CC). Widening the band by way of gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile station apparatus UE (User Equipment) #1 is a mobile station apparatus to support the LTE-A system (and also support the LTE system), and supports a system band up to 100 MHz. UE #2 is a mobile station apparatus to support the LTE-A system (and also support the LTE system), and supports a system band up to 40 MHz (20 MHz×2=40 MHz). UE #3 is a mobile station apparatus to support the LTE system (and not support the LTE-A system), and supports a system band up to 20 MHz (base band).

Figure 2:
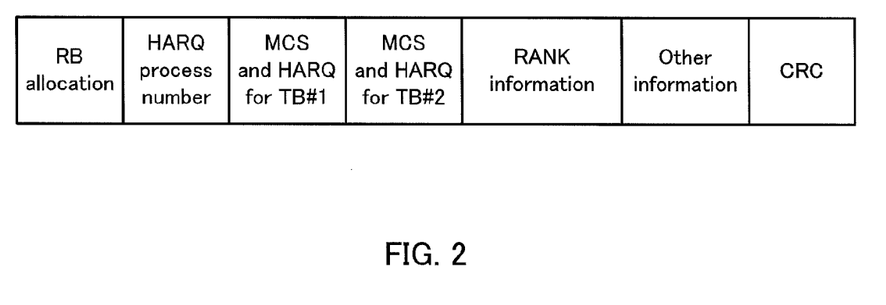
FIG. 2 is a schematic diagram for explaining DCI format 2B in the LTE system of Rel. 9.

In the LTE system of Release 9 (Rel. 9), SU-MIMO and MU-MIMO, which use user-specific demodulate reference signals (UE-specific RSs), are defined with the same DCI format (DCI format 2B). FIG. 2 is a schematic diagram for explaining DCI format 2B in the LTE system of Rel. 9.

As illustrated in FIG. 2, the DCI format defined in the LTE system of Rel. 9 contains resource allocation information (resource block allocation) per terminal, HARQ information, which is information to represent an identifier (NDI: New Data Indicator) to identify between new data and retransmission data, and information (redundancy version) to show which part of redundancy is transmitted by HARQ, information (MCS information) related to the most efficient MCS (Modulation and Coding Scheme) to satisfy the assigned resource block error rate, information (HARQ information) related to HARQ, which is used to correct data reception errors that occur on the terminal side with high efficiency and low delay, rank information to show the number of transmitting streams, other information, and cyclic redundancy check (CRC) code.

Note that the MCS information and HARQ information are defined per transport block (TB), which is the data retransmission unit (FIG. 2 shows MCS information and HARQ information corresponding to TB #1 and TB #2). A transport block is also referred to as a codeword. Other information includes, for example, the hybrid HARQ process number, which designates a corresponding memory upon synthesizing the initial transmission and retransmission packets, and the transmission power control command for the PUCCH (TPC for PUCCH).

In the event of trying to allow the number of streams or the number of space-multiplexed users to be supported in LTE-A by using the configuration of DCI format 2B having this configuration, in LTE-A, maximum eight streams or maximum eight users can be supported, so that, particularly, the rank information includes increased information, and the number of bits of the DCI format increases. Generally speaking, the amount of information to be defined in the DCI format varies between SU-MIMO and MU-MIMO, and therefore the number of bits for the DCI format for SU-MIMO and the number of bits for the DCI format for MU-MIMO do not necessarily become the same. On the other hand, in the event of identifying the DCI format by one blind detection in the mobile station apparatus UE, the number of bits of the DCI format must be the same. In the event the number of bits varies between the DCI format for SU-MIMO and the DCI format for MU-MIMO, it is necessary to perform blind detection separately. The present inventor has focused on the fact that the difference of the number of bits between the DCI formats for SU-MIMO and for MU-MIMO influences the number of searches in blind detection in the mobile station apparatus UE, and has arrived at the present invention.

Figure 3:
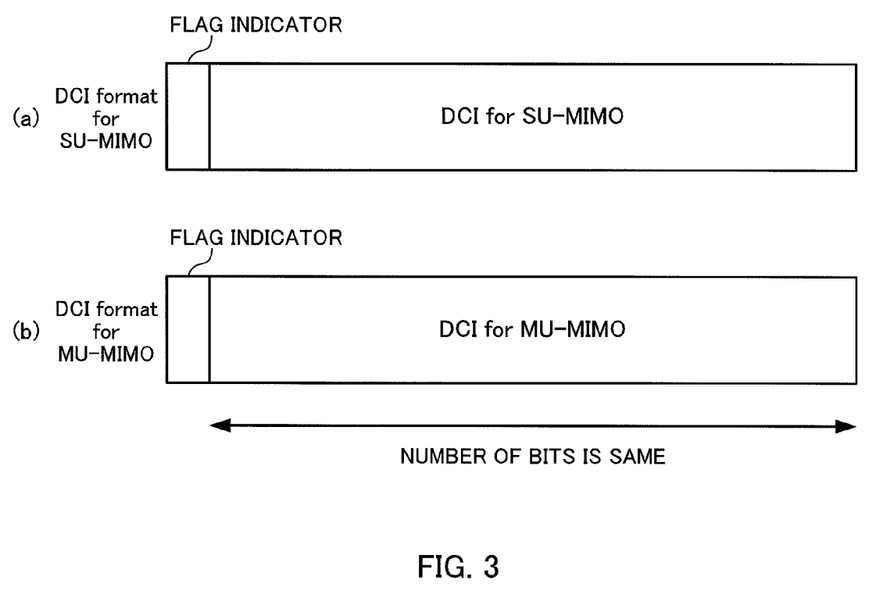
FIG. 3 provides schematic diagrams for explaining an overview of DCI formats used in a mobile communication system according to the present invention.

According to one embodiment of the present invention, the number of bits of the DCI format to be reported by the PDCCH (Physical Downlink Control Channel) is made the same between SU-MIMO and MU-MIMO, and, in that DCI format, an additional field, in which a flag indicator to identify between SU-MIMO and MU-MIMO is set, is provided. FIG. 3 is a schematic diagram for explaining an overview of DCI formats in the mobile communication system according to the present invention.

As illustrated in FIGS. 3(*a*) and (*b*), in the DCI formats for SU-MIMO and MU-MIMO, the number of bits is the same between the two, and, at the top, an additional field (one bit), in which a flag indicator to identify between SU-MIMO and MU-MIMO is set, is provided. Note that information included in the DCI format, besides the flag indicator, varies between SU-MIMO and MU-MIMO.

According to this embodiment, by making the number of bits the same between the DCI formats for SU-MIMO and MU-MIMO, it is possible to decode information of the DCI formats without increasing the number of searches for blind detection in the mobile station apparatus UE. Then, given that the DCI formats include a flag indicator to identify between SU-MIMO and MU-MIMO, it is possible to identify between the DCI formats for SU-MIMO and MU-MIMO, so that it is possible to switch between SU-MIMO and MU-MIMO dynamically.

Figure 4:
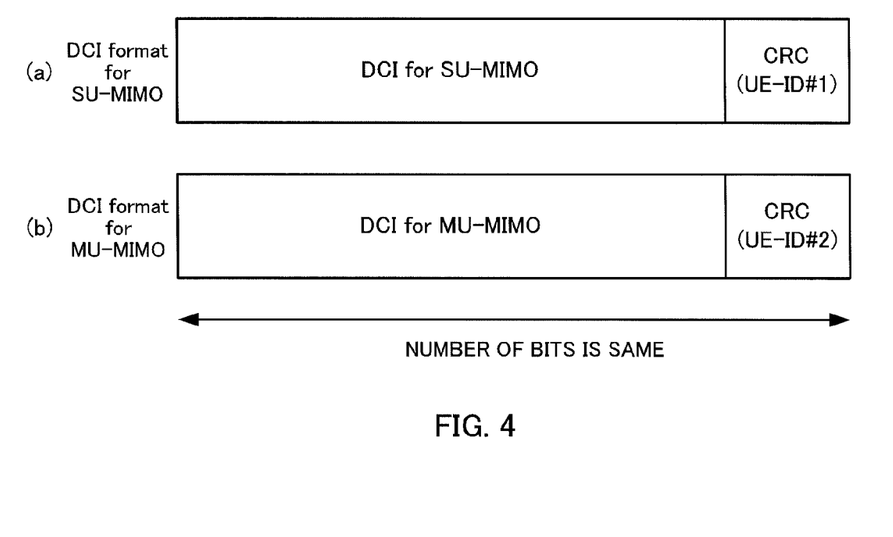
FIG. 4 provides schematic diagrams for explaining an overview of DCI formats used in a mobile communication system according to the present invention.

According to another embodiment of the present invention, the number of bits in the DCI format reported by the PDCCH is made the same between SU-MIMO and MU-MIMO, and part of that DCI format is masked by a unique user identifier (UE-ID) for identifying SU-MIMO or MU-MIMO. FIG. 4 is a schematic diagram for explaining an overview of the DCI formats used in the mobile communication system according to the present invention.

As illustrated in FIGS. 4(*a*) and (*b*), the number of bits is the same between the DCI formats for SU-MIMO and MU-MIMO, and a 16-bit CRC code, attached to the tail end of these DCI formats, is masked by a user identifier for SU-MIMO (UE-ID #1) or by a user identifier for MU-MIMO (UE-ID #2). Note that, as a masking technique, for example, it is possible to use operation process of exclusive disjunction between the CRC codes and user identifiers (UE-IDs #1 and #2).

According to this example, by making the number of bits the same between the DCI formats for SU-MIMO and MU-MIMO, it is possible to decode information of the DCI formats without increasing the number of searches for blind detection in the mobile station apparatus UE. Then, given that CRC codes, which are masked by different user identifiers (UE-IDs) for identifying between SU-MIMO and MU-MIMO, are attached to the DCI formats, a mobile station apparatus (UE) is able to identify between the DCI formats for SU-MIMO and MU-MIMO by reconstructing the CRC code using the user identifier (in this case, UE-ID #1 or #2) assigned to the user, so that is it possible to switch between SU-MIMO and MU-MIMO dynamically.

Also, according to this embodiment, like the DCI formats of the embodiment illustrated in FIG. 3, it is not necessary to provide an additional field for a flag indicator, so that it is possible to reduce the number of bits of the DCI format itself lower than that DCI format (here, the number of bits of the DCI format is reduced by one bit).

Now, in the event of performing MU-MIMO transmission in an LTE-A system, MU-MIMO-specific information is reported to a mobile station apparatus UE, and the mobile station apparatus UE makes use of that information, so that, for example, it is possible to achieve the advantages of improving the accuracy of channel estimation and reducing interference that is produced from and against another mobile station apparatus UE. Consequently, in a mobile communication system according to the present invention, information included in the DCI format for MU-MIMO is removed, and the part given by this removal is used to transmit MU-MIMO-specific information. To be more specific, by adding a certain limitation to the maximum number of streams and/or maximum number of codewords per mobile station apparatus UE in the event MU-MIMO transmission is performed, information to be included in the DCI format for MU-MIMO is removed and MU-MIMO-specific information is added in the part given by this removal.

In a mobile communication system according to the present invention, in order to remove the information to be included in the DCI format for MU-MIMO, selection can be made from a method of limiting the maximum number of streams per mobile station apparatus UE to two streams (method 1), a method of limiting the maximum number of streams per mobile station apparatus UE to one stream (method 2), a method of limiting the maximum number of streams per mobile station apparatus UE to two streams and limiting the maximum number of codewords per mobile station apparatus UE to one codeword (method 3), and a method of limiting the maximum number of streams per mobile station apparatus UE to one stream and limiting the maximum number of codewords per mobile station apparatus UE to one codeword (method 4). Note that, as for the maximum number of streams and maximum number of codewords in the event of performing SU-MIMO transmission, assume that these are set to the number of transmission antennas and to two codewords, as in an existing LTE system.

Figure 5:
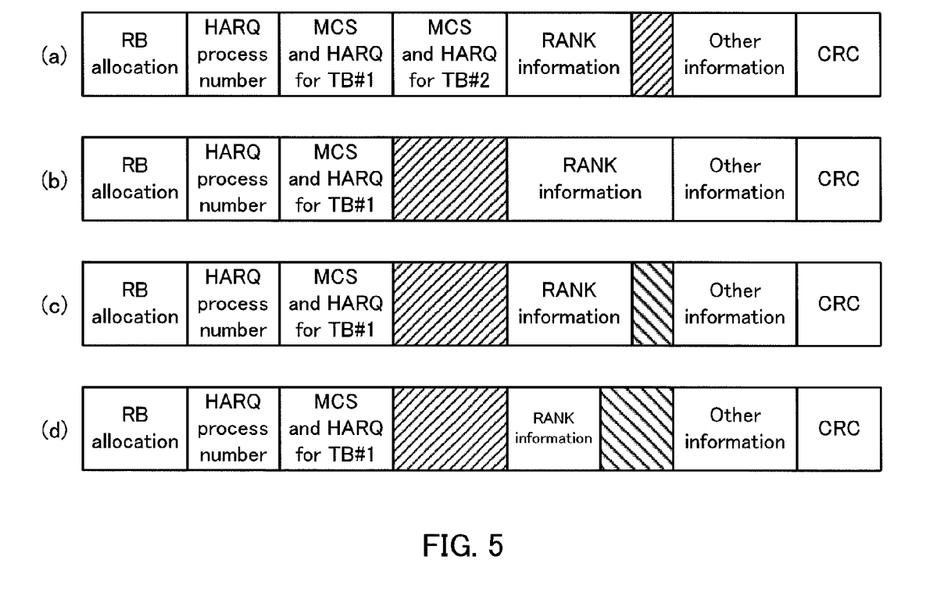
FIG. 5 provides schematic diagrams for explaining information to be removed from DCI formats used in a mobile communication system according to the present invention.

Hereinafter, information that can be removed from the DCI format for MU-MIMO according to above method 1 to method 4 will be explained with reference to FIG. 5. FIGS. 5(*a*) to (*d*) are schematic diagrams for explaining information to be removed from the DCI formats to be used in a mobile communication system according to the present invention. FIG. 5(*a*) illustrates information that is removed from a DCI format according to method 1. FIG. 5(*b*) illustrates information that is removed from a DCI format according to method 2. FIG. 5(*c*) illustrates information that is removed from a DCI format according to method 3. FIG. 5(*d*) illustrates information that is removed from a DCI format according to method 4.

In the DCI format for MU-MIMO illustrated in FIG. 5(*a*), the maximum number of streams per mobile station apparatus UE is limited to two streams. Note that no particular limitation is applied to the maximum number of codewords per mobile station apparatus UE (that is to say, limited to two codewords). Given that the maximum number of streams per mobile station apparatus UE is limited to two streams, in the DCI format, the rank information to represent the number of transmitting streams is removed. By this means, it is possible to add MU-MIMO-specific information to the field (the part shown with diagonal lines) from which the rank information has been removed. Note that, although a case has been described here with method 1 where the maximum number of streams per mobile station apparatus UE is limited to two streams, it is also possible to limit the maximum number of streams to one stream. In this case, it is possible to remove rank information representing the number of transmitting streams, and add more MU-MIMO-specific information.

In the DCI format for MU-MIMO illustrated in FIG. 5(*b*), the maximum number of codewords per mobile station apparatus UE is limited to one codeword. Note that no particular limitation is applied to the maximum number of streams per mobile station apparatus UE. Given that the maximum number of codewords per mobile station apparatus UE is limited to one codeword, in the DCI format, the MCS information and HARQ information corresponding to transport block TB #2 are removed. By this means, it is possible to add MU-MIMO-specific information to the fields (the parts shown with diagonal lines) from which the MCS information and HARQ information have been removed.

In the DCI format for MU-MIMO illustrated in FIG. 5(*c*), the maximum number of streams per mobile station apparatus UE is limited to two streams, and the maximum number of codewords is limited to one codeword. Given that the maximum number of streams per mobile station apparatus UE is limited to two streams and the maximum number of codewords is limited to one codeword, in the DCI format, the rank information to represent the number of transmitting streams, and the MCS information and HARQ information that correspond to transport block TB #2, are removed. By this means, it is possible to add MU-MIMO-specific information to the fields (the parts shown with diagonal lines) from which these pieces of information have been removed.

In the DCI format for MU-MIMO illustrated in FIG. 5(*d*), the maximum number of streams per mobile station apparatus UE is limited to one stream, and the maximum number of codewords is limited to one codeword. Given that the maximum number of streams per mobile station apparatus UE is limited to one stream and the maximum number of codewords is limited to one codeword, in the DCI format, the rank information to represent the number of transmitting streams, and the MCS information and HARQ information that correspond to transport block TB #2, are removed. In particular, given that the maximum number of streams per mobile station apparatus UE is limited to one stream, the degree of removal of rank information is increased greater than the degree of removal by method 3. By this means, it is possible to add MU-MIMO-specific information to the fields (the parts shown with diagonal lines) from which these pieces of information have been removed.

These certain limitations to the maximum number of streams and/or the maximum number of codewords per mobile station apparatus UE can be realized by applying certain limitations to feedback information (to be more specific, information related to the rank number (the number of streams)) from the mobile station apparatus UE to the base station apparatus eNode B. These limitations to feedback information are provided by, for example, control signals (codebook subset restriction) defined by upper layer signals (RRC signals). When a limitation to feedback information is designated by an RRC signal, feedback information to match the content of that limitation is fed back from the mobile station apparatus UE, and radio resource scheduling is performed by the base station apparatus eNode B based on that feedback information.

In the DCI field in the DCI format for MU-MIMO given by removal according to above method 1 to method 4, in the mobile communication system according to the present invention, at least one of the following can be added as MU-MIMO-specific information: (i) density information of demodulate reference signals (DMRSs); (ii) DMRS information assigned to another mobile station apparatus UE; and (iii) the transmission power ratio of the data channels (PDSCHs: Physical Downlink Shared Channels) and DMRSs. Hereinafter, advantages to be achieved upon adding the MU-MIMO-specific information illustrated in above (i) to (iii) will be explained in detail.

Figure 6:
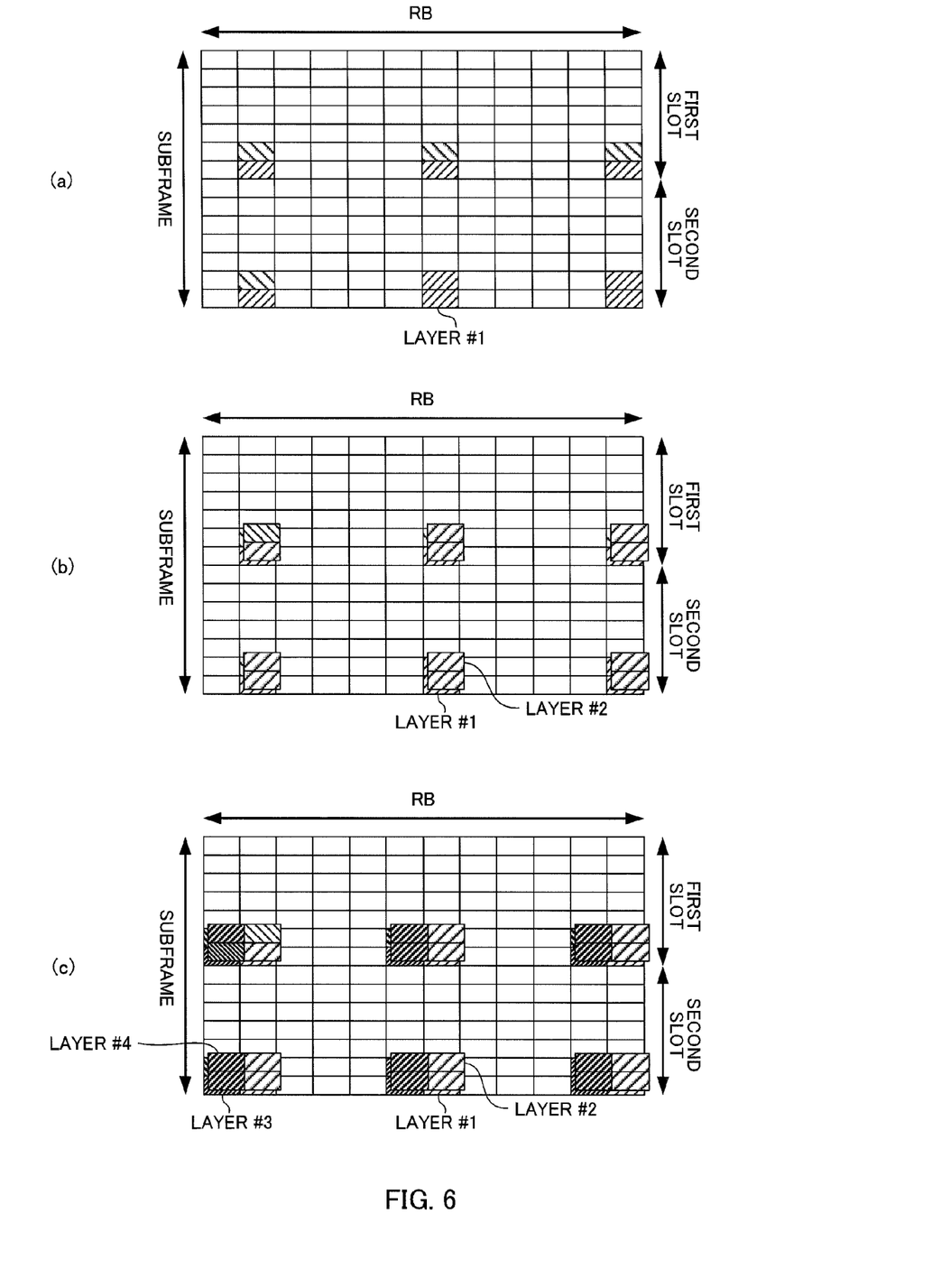
FIG. 6 provides schematic diagrams for explaining a DMRS multiplexing method in an LTE-A system.

Here, DMRS multiplexing method in LTE-A system will be described before the advantage in the event of adding the DMRS density information of above (i) will be described. FIG. 6 is a schematic diagram for explaining the DMRS multiplexing method in an LTE-A system. FIG. 6(a) illustrates the state of DMRS multiplexing per one resource block (RB) in the event the number of streams to be space-multiplexed is one (in the event of rank 1). Likewise, FIG. 6(b) and FIG. 6(c) illustrate the state of DMRS multiplexing per one RB in the event the number of streams to be space-multiplexed is two and four (in the event of ranks 2 and 4). As illustrated in FIGS. 6(a) to (c), with DMRSs in an LTE-A system, the density changes with the number of streams to be space-multiplexed (that is to say, with the rank number). Note that one resource block is formed with twelve subcarriers (180 kHz). One subframe is formed with the first and second slots in the time domain, and one slot is formed with seven OFDM symbols. One resource element (RE) is formed with one subcarrier×one OFDM symbol.

In the event of rank 1, as illustrated in FIG. 6(a), DMRSs of layer 1 are allocated to twelve REs per one RB. In the event of rank 2, as illustrated in FIG. 6(b), DMRSs of layer 2 are subjected to code division multiplexing (CDM) over the REs to which DMRSs of layer 1 are allocated. In the event of rank 3, DMRSs of layer 3 are subjected to frequency division multiplexing (FDM) over the REs of subcarrier neighboring the REs to which the DMRSs of layers 1 and 2 are allocated (see FIG. 6(c)). In the event of rank 4, as illustrated in FIG. 6(c), DMRSs of layer 4 are subjected to code division multiplexing (CDM) over the REs to which DMRSs of layer 3 are allocated. That is to say, the density of DMRSs per one RB varies between ranks 1, 2 and ranks 3, 4.

In the event of adding the DMRS density information of above (i), density information which changes according to the rank number in this way is added to the DCI format for MU-MIMO. In the event of ranks 1 and 2 illustrated in FIGS. 6(a) and (b), density information (twelve REs/RBs) representing that twelve DMRSs are allocated per one RB, is added. On the other hand, in the event of ranks 3 and 4 illustrated in FIG. 6(c), density information (twenty-four REs/RBs) representing that twenty four DMRSs are allocated per one RB, is added. In this way, when a PDCCH containing the DCI format for MU-MIMO, to which DMRS density information is added, is received, the mobile station apparatus UE is able to recognize the situation of the data channel signal (PDSCH) puncturing process according to the DMRS density information. Then, by demodulating transmission data adequately from that recognized result, it is possible to prevent collision of the DMRS for the user of a certain mobile station apparatus UE and the PDSCH for another mobile station apparatus UE, so that it is possible to improve the accuracy of channel estimation in the former mobile station apparatus UE.

In the event of adding the DMRS information allocated to another mobile station apparatus UE of above (ii), if a PDCCH containing the DCI format for MU-MIMO is received, the mobile station apparatus UE is able to recognize what DMRS information is allocated to another mobile station apparatus UE. By this means, it is possible to cancel transmission data (data channel signal) for another mobile station apparatus UE according to DMRS information allocated to the other mobile station apparatus UE, so that it is possible to reduce interference with transmission data for the other mobile station apparatus UE.

In the event of adding the transmission power ratio of the data channel signals (PDSCHs) and DMRSs of above (iii), when a PDCCH to contain the DCI format for MU-MIMO is received, the mobile station apparatus UE is able to recognize the transmission power ratio of the DMRSs with respect to the data channel signals. By this means, in the event the transmission power for DMRSs is amplified in the base station apparatus eNode B, the mobile station apparatus UE is able to learn the transmission power ratio of the DMRSs and the PDSCHs and demodulate the data channel, so that it is possible to use DMRS transmission power effectively and improve the accuracy of channel estimation in the mobile station apparatus UE.

Figure 7:
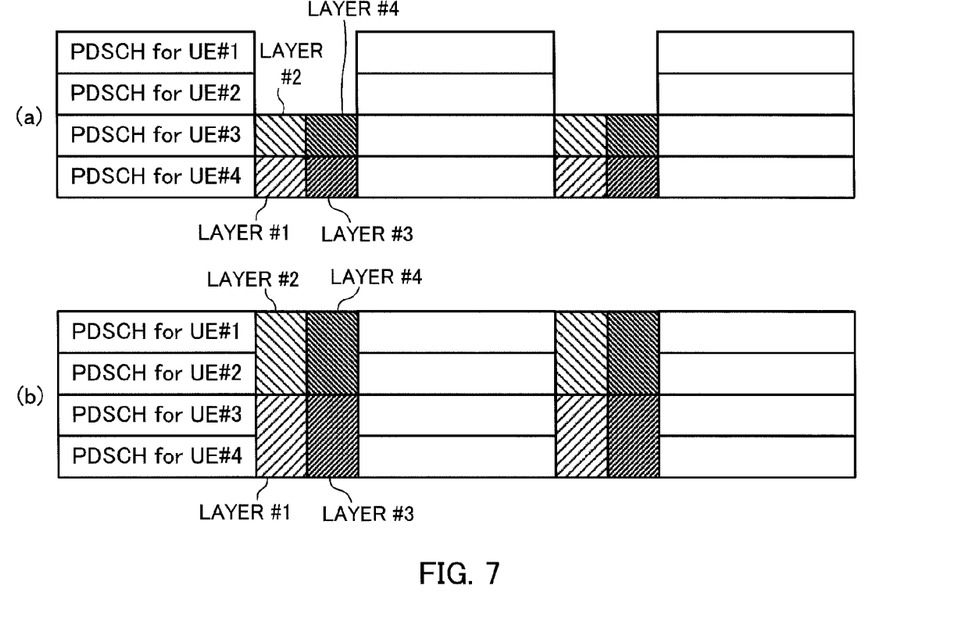
FIG. 7 provides schematic diagrams for explaining a transmission power ratio of data channel signals and DMRSs in an LTE-A system.

Here, the transmission power ratio of data channel signals (PDSCHs) and DMRSs in an LTE-A system will be described. FIG. 7 provides schematic diagrams for explaining the transmission power ratio of data channel signals (PDSCHs) and DMRSs in an LTE-A system. FIG. 7(a) illustrates a case where the transmission power ratio of DMRSs with respect to PDSCHs is not adjusted (amplified), and FIG. 7(b) illustrates a case where the transmission power ratio DMRSs with respect to PDSCHs is adjusted (amplified) in the base station apparatus eNode B according to the present invention. Note that FIG. 7 illustrates cases where the number of streams to be space-multiplexed is four (that is, in the event of rank 4) for ease of explanation.

As illustrated in FIG. 7(a), in the event the transmission power ratio of DMRSs with respect to PDSCHs is not adjusted (amplified), the DMRS transmission power is set to certain transmission power that is lower than the PDSCH transmission power. Consequently, it is impossible to make use of transmission power in REs to which DMRSs are allocated. By contrast with this, as illustrated in FIG. 7(b), in the event the transmission power ratio of DMRSs with respect to PDSCHs is adjusted (amplified), it is possible to make use of transmission power in REs to which DMRSs are allocated, so that the mobile station apparatus UE is able to perform channel estimation based on the DMRSs after this adjustment (amplification). By this means, compared to the case where the transmission power is set lower than for PDSCHs, it is possible to improve the accuracy of channel estimation.

Figure 8:
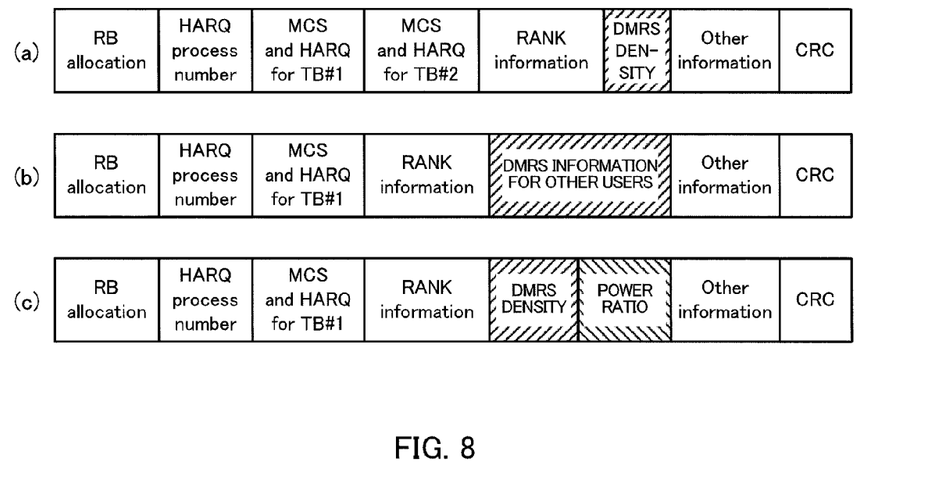
FIG. 8 provides schematic diagrams showing examples of DCI formats for MU-MIMO in the event MU-MIMO-specific information is added.

FIG. 8 is a schematic diagram showing an example of DCI format for MU-MIMO in the event MU-MIMO-specific information illustrated in above (i) to (iii) is added. FIG. 8(a) illustrates a case where DMRS density information is added to the DCI format illustrated in FIG. 5(a). FIG. 8(b) illustrates a case where DMRS information allocated to another mobile station apparatus UE is added to the DCI format illustrated in FIG. 5(b). FIG. 8(c) illustrates a case where DMRS density information and the transmission power ratio (power ratio) of PDSCHs and DMRSs are added to the DCI format illustrated in FIG. 5(c) or FIG. 5(d). By receiving a PDCCH including the DCI format for MU-MIMO to which MU-MIMO-specific information is added, the mobile station apparatus UE is able to achieve the above advantages.

Hereinafter, embodiments of the present invention will be described below in detail with reference to the accompanying drawings. Here, a case will be described where a base station apparatus and a mobile station apparatus to support the LTE-A system are used.

Figure 9:
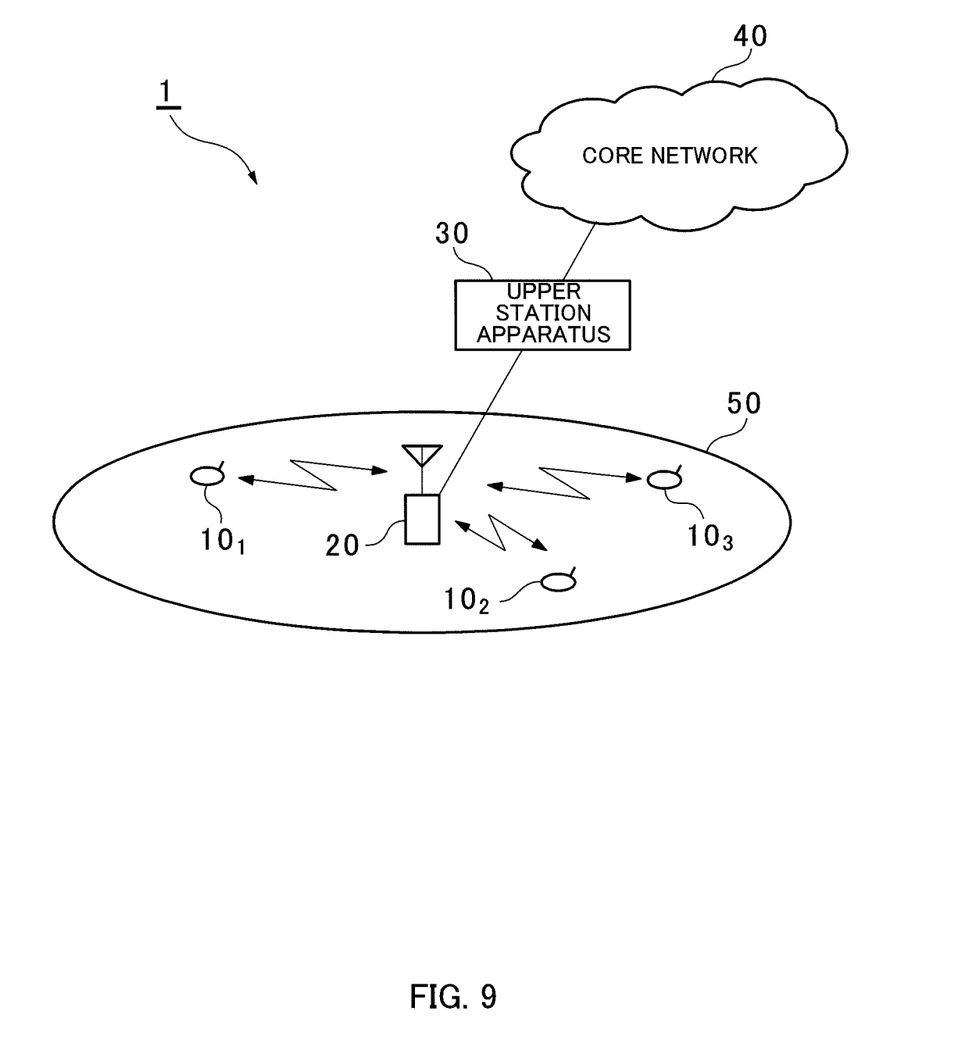
FIG. 9 is a diagram for explaining a configuration of a mobile communication system according to an embodiment of the present invention.

Referring to FIG. 9, a mobile communication system 1 having a mobile station apparatus (UE) 10 and a base station apparatus (eNode B) 20 according to an embodiment of the present invention will be described. FIG. 9 is a diagram for explaining a configuration of the mobile communication system 1 having the mobile station apparatus 10 and the base station apparatus 20 according to the present embodiment. Note that the mobile communication system 1 illustrated in FIG. 9 is a system to accommodate, for example, the LTE system or SUPER 3G. Also, this mobile communication system 1 may be referred to as IMT-Advanced or may be referred to as 4G.

As illustrated in FIG. 9, the mobile communication system 1 is configured to include the base station apparatus 20 and a plurality of mobile station apparatuses 10 ($10_1$, $10_2$, $10_3$, ... $10_n$, where n is an integer to satisfy n>0) that communicate with this base station apparatus 20. The base station apparatus 20 is connected with an upper station apparatus 30, and this upper station apparatus 30 is connected with a core network 40. The mobile station apparatus 10 communicates with the base station apparatus 20 in a cell 50. Note that the upper station apparatus 30 includes, for example, an access gateway apparatus, a radio network controller (RNC), a mobility management entity (MME) and so on, but is by no means limited to these.

The mobile station apparatuses ($10_1$, $10_2$, $10_3$, ... $10_n$) have the same configuration, functions and state, so that the following description will be given with respect to "mobile station apparatus 10," unless specified otherwise. Also, although the mobile station apparatus 10 performs radio communication with the base station apparatus 20 for ease of explanation, more generally, user apparatuses (UE: User Equipment) including mobile terminal apparatuses and fixed terminal apparatuses may be used.

In the mobile communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, the communication channels in the LTE system will be described. As for the downlink, a PDSCH, which is used by each mobile station apparatus 10 on a shared basis, and downlink L1/L2 control channels (including the PDCCH, PCFICH and PHICH) are used. By means of this PDSCH, user data, that is, normal data signals, is transmitted. Transmission data is included in this user data. Note that the component carrier information and scheduling information that are assigned to the mobile station apparatus 10 by the base station apparatus 20 are reported to the mobile station apparatus 10 by the L1/L2 control channels.

On the uplink, a PUSCH (Physical Uplink Shared Channel), which is used by each mobile station apparatus 10 on a shared basis, and a PUCCH (Physical Uplink Control Channel), which is an uplink control channel, are used. User data is transmitted by means of this PUSCH. Furthermore, by means of this PUCCH, downlink radio quality information (CQI: Channel Quality Indicator) and so on, are transmitted.

Figure 10:
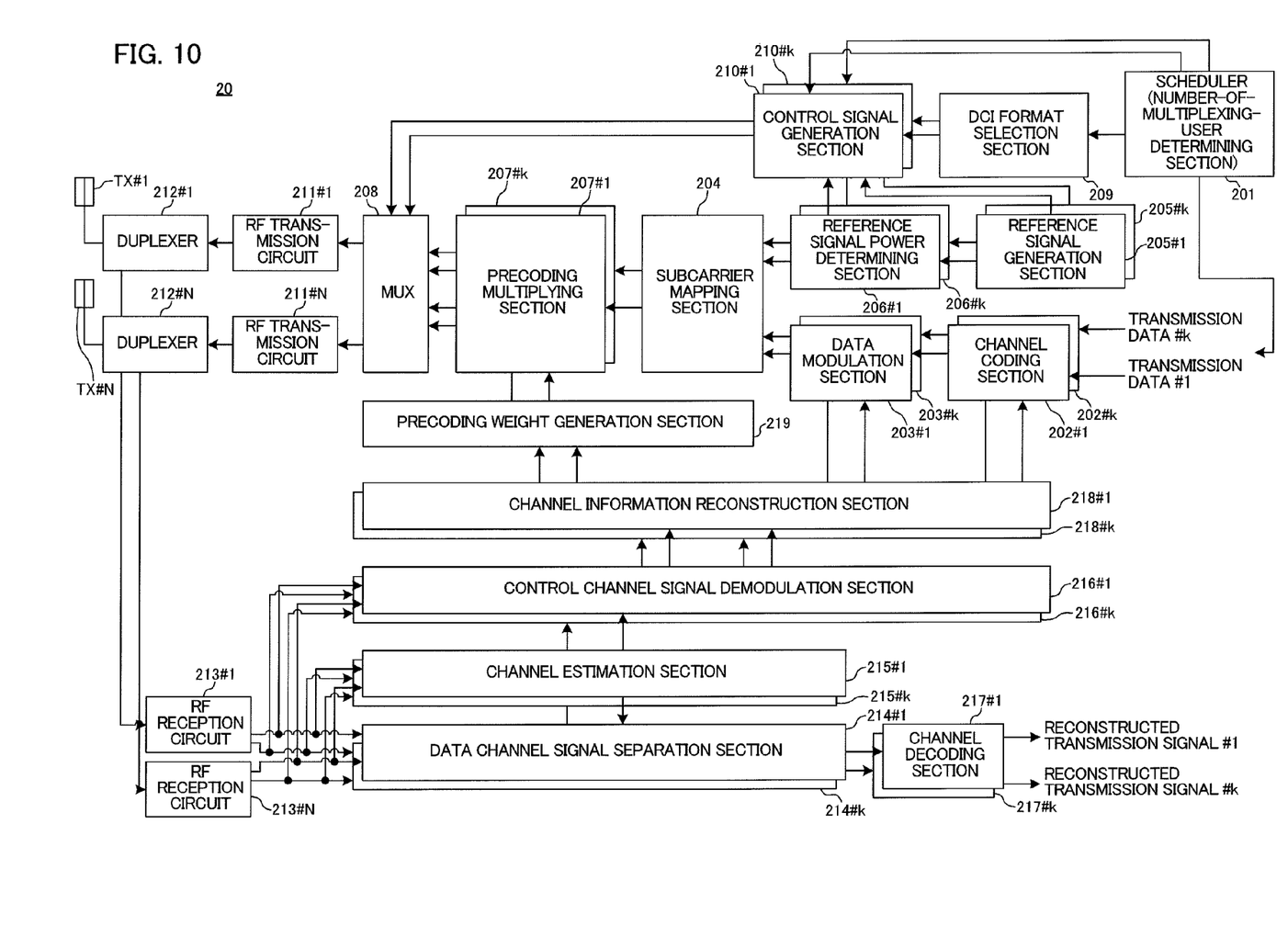
FIG. 10 is a block diagram showing a configuration of a base station apparatus according to the above embodiment.
Figure 11:
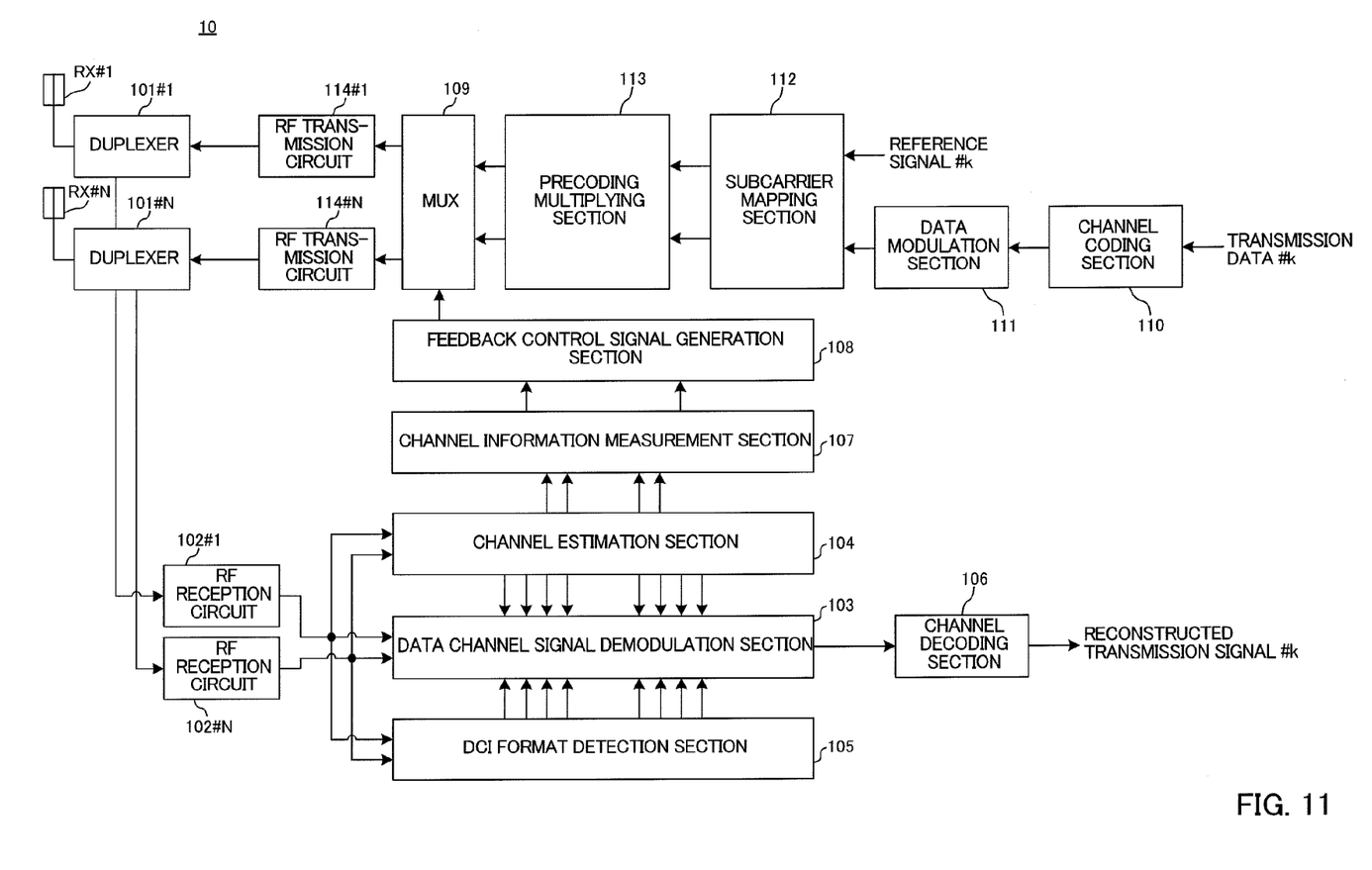
FIG. 11 is a block diagram showing a configuration of the mobile station apparatus according to the above embodiment.

FIG. 10 is a block diagram showing a configuration of the base station apparatus 20 according to the present embodiment. FIG. 11 is a block diagram showing a configuration of the mobile station apparatus 10 according to the present embodiment. Note that the base station apparatus 20 and mobile station apparatus 10 illustrated in FIG. 10 and FIG. 11 have configurations given by simplifying the present invention for ease of explanation, and both have configurations which a general base station apparatus and mobile station apparatus have. Note that, a case will be described with the mobile station apparatus 10 and base station apparatus 20 illustrated in FIG. 10 and FIG. 11 where a flag indicator is set in a DCI format in order to identify between the DCI format for SU-MIMO and the DCI format for MU-MIMO (see FIG. 3).

In the base station apparatus 20 illustrated in FIG. 10, the scheduler 201 determines the number of users to multiplex (the number of multiplexing users), based on channel estimation values given from channel estimation sections 215 #1 to 215 #k, which will be described later. Then, the content of uplink/downlink resource allocation (scheduling information) for each user is determined, and transmission data #1 to #k, which correspond to users #1 to #k, are transmitted to channel coding sections 202 #1 to 202 #k. Note that, given user #1 to user #k, in the event the number of users to multiplex determined by the scheduler 201 is a plurality of users, users of different mobile station apparatuses 10 are selected, and, in the event of a single user, the user of the same mobile station apparatus 10 is selected. The number of users to multiplex determined by the scheduler 201 is output to a DCI format selection section 209 and control signal generation sections 210 #1 to 210 #k, which will be described later. Here, the number of users to multiplex is output to the control signal generation sections 210 #1 to 210 #k to report DMRS density information in the PDCCH.

Transmission data #1 to #k are subjected to channel coding in channel coding sections 202 #1 to 202 #k, and then output to data modulation sections 203 #1 to 203 #k for data demodulation. Here, the channel coding and data modulation are performed based on the channel coding rates and modulation schemes given from channel information reconstruction sections 218 #1 to 218 #k, which will be described later. Transmission data #1 to #k, subjected to data modulation in data modulation sections 203 #1 to 203 #k, are subjected to an inverse Fourier transform in a discrete Fourier transform section (not shown), converted from a time sequence signal into a frequency domain signal, and output to a subcarrier mapping section 204.

Reference signal generation sections 205 #1 to 205 #k generate individual reference signals (UE-specific RSs) for data channel demodulation for user #1 to user #k. Assume that, here, DMRSs for user #1 to user #k are generated. The DMRSs generated by reference signal generation sections 205 #1 to 205 #k are output to reference signal power determining sections 206 #1 to 206 #k, and also output to control signal generation sections 210 #1 to 210 #k, which will be described later. Here, the DMRSs are output to control signal generation sections 210 #1 to 210 #k, in order to report DMRS information assigned to a plurality of mobile station apparatuses.

Reference signal power determining sections 206 #1 to 206 #k determine the transmission power of each DMRS received from reference signal generation sections 205 #1 to 205 #k, and adjusts each DMRS to that transmission power. The DMRSs with transmission power adjusted by reference signal power determining sections 206 #1 to 206 #k are output to the subcarrier mapping section 204. Also, information related to the transmission power of each DMRS is output to control signal generation sections 210 #1 to 210 #k. Here, information related to the transmission power of each DMRS is output to control signal generation sections 210 #1 to 210 #k, in order to report the transmission power ratio of the DMRSs with respect to data channel signals (PDSCHs).

In the subcarrier mapping section 204, transmission data #1 to #k are mapped to subcarriers in accordance with schedule information given from the scheduler 201. Here, the subcarrier mapping section 204 maps (multiplexes) each DMRSs received as input from reference signal power determining sections 206 #1 to 206 #k, to subcarriers, with transmission data #1 to #k. Transmission data #1 to #k, mapped to subcarriers in this way, are output to precoding multiplying sections 207 #1 to 207 #k.

Precoding multiplying sections 207 #1 to 207 #k performs phase and/or amplitude shifting of transmission data #1 to #k (weighting of transmission antennas TX #1 to transmission antenna TX #N by precoding), for each of transmission antennas TX #1 to TX #N, based on precoding weights given from a precoding weight generation section 219, which will be described later. Transmission data #1 to #k, subjected to phase and/or amplitude shifting in precoding multiplying sections 207 #1 to 207 #k, are output to a multiplexer (MUX) 208.

DCI format selection section 209 constitutes an identification information selection section, and selects a DCI format in accordance with the number of users to multiplex determined by the scheduler 201. Here, in the event the number of users to multiplex is a single user, the DCI format for SU-MIMO is selected, and, in the event the number of users to multiplex is a plurality of users, the DCI format for MU-MIMO is selected. Note that, in the event the number of users to multiplex is a plurality of users, the DCI format for MU-MIMO is selected on a per user basis. The DCI formats for SU-MIMO and MU-MIMO are determined by the content of the flag indicators included in the DCI formats. That is to say, by selecting the content of a flag indicator, the DCI format for SU-MIMO or for MU-MIMO is selected. The DCI formats selected by the DCI format selection section 209 are output to control signal generation sections 210 #1 to 210 #k.

Control signal generation sections 210 #1 to 210 #k constitute a control signal generation section, and generate control signals (PDCCHs), based on the DCI formats from the DCI format selection section 209, the number of users to multiplex from the scheduler 201, each DMRSs from reference signal generation sections 205 #1 to 205 #k, and information related to the transmission power of each DMRS from reference signal power determining sections 206 #1 to 206 #k. The control signals to be generated include the DCI formats for SU-MIMO and MU-MIMO, having the same number of bits. In the event the DCI format for MU-MIMO is selected by the DCI format selection section 209, control signal generation sections 210 #1 to 210 #k generate, for example, PDCCHs including the DCI formats illustrated in FIG. 8. That is to say, in the control signals to be generated, certain limitations are applied to the maximum number of streams and/or the maximum number of codewords per mobile station apparatus 10, information included in the DCI format is removed, and MU-MIMO-specific information is added in the DCI field. The PDCCHs generated by control signal generation sections 210 #1 to 210 #k are output to the multiplexer (MUX) 208.

For example, in control signal generation sections 210 #1 to 210 #k, by receiving the number of users to multiplex reported from the scheduler 201, it is possible to generate a PDCCH including the DCI format for MU-MIMO, to which DMRS density information in the control signals (PDCCHs) is added. Also, by receiving each DMRS reported from the reference signal generation sections 205 #1 to 205 #k, it is possible to generate a PDCCH including the DCI format for MU-MIMO, to which DMRS information allocated to another mobile station apparatuses is added. Furthermore, by receiving information related to the transmission power of each DMRS reported from reference signal power determining sections 206 #1 to 206 #k, it is possible to generate a PDCCH including the DCI format for MU-MIMO, to which the transmission power ratio of the DMRSs with respect to the PDSCHs is added.

The multiplexer (MUX) 208 synthesizes transmission data #1 to #k subjected to phase and/or amplitude shifting, and the PDCCHs generated in control signal generation sections 210 #1 to 210 #k, and generates transmission signals for each of transmission antennas TX #1 to TX #N. The transmission signals generated by the multiplexer (MUX) 208 are converted from frequency domain signals to time domain signal through an inverse fast Fourier transform, in an inverse fast Fourier transform section (not shown), and then output to RF transmission circuits 211 #1 to 211 #N. Then, after a frequency conversion process for conversion into a radio frequency band is performed in RF transmission circuits 211 #1 to 211 #N, the results are output to transmission antennas TX #1 to TX #N, through duplexers 212 #1 to 212 #N, and transmitted to mobile station apparatus 10 on the downlink from transmission antennas TX #1 to TX #N.

On the other hand, transmission signals transmitted on the uplink from the mobile station apparatus 10 are received by transmission antennas TX #1 to TX #N, electrically separated into the transmission route and the reception route by duplexers 212 #1 to 212 #N, and then output to RF reception circuits 213 #1 to 213 #N. Then, after a frequency conversion process for conversion from radio frequency signals into baseband signals is performed in RF reception circuits 213 #1 to 213 #N, the results are subjected to a Fourier transform in a fast Fourier transform section (FFT section: not shown) and converted from time sequence signals into frequency domain signals. The received signals converted into these frequency domain signals are output to data channel signal separation sections 214 #1 to 214 #k.

Data channel signal separation sections 214 #1 to 214 #k separate the received signals input from the FFT section, by, for example, a maximum likelihood detection (MLD) signal separation method. By this means, the received signals having arrived from the mobile station apparatus 10 are separated into received signals related to user #1 to user #k. Channel estimation sections 215 #1 to 215 #k estimate the channel states from the reference signals included in the received signals output from the FFT section, and report the estimated channel states to data channel signal separation sections 214 #1 to 214 #k and to control channel signal demodulation sections 216 #1 to 216 #k. Data channel signal separation sections 214 #1 to 214 #k separate the received signals by the above-described MLD signal separation method, based on the reported channel states.

The received signals related to user #1 to user #k, separated in data channel signal separation sections 214 #1 to 214 #k, are demapped in a subcarrier demapping section (not shown), and converted back to time sequence signals and then subjected to data demodulation in a data demodulation section (not shown). Then, as a channel decoding process is performed in channel decoding sections 217 #1 to 217 #k, transmission signal #1 to transmission signal #k are reconstructed.

Control channel signal demodulation sections 216 #1 to 216 #k demodulate the control channel signals (for example, PDCCHs) included in the received signals input from the FFT section. Here, control channel signal demodulation sections 216 #1 to 216 #k demodulate control channel signals to correspond to user #1 to user #k. Here, control channel signal demodulation sections 216 #1 to 216 #k demodulate the control channel signals based on the channel states reported from channel estimation sections 215 #1 to 215 #k. The control channel signals demodulated by control channel signal demodulation sections 216 #1 to 216 #k are output to channel information reconstruction sections 218 #1 to 218 #k.

Channel information reconstruction sections 218 #1 to 218 #k reconstruct information (channel information) related to the channels, from the information included in the control channel signals (for example, PUCCHs) input from control channel signal demodulation sections 216 #1 to 216 #k. The channel information includes, for example, information such as the information included in the DCI formats reported by the PDCCH, CQIs and PMIs (Precording Matrix Indicators) and rank information. The CQI information reconstructed by channel information reconstruction sections 218 #1 to 218 #k are output to data modulation sections 203 #1 to 203 #k and channel coding sections 202 #1 to 202 #k. The PMIs reconstructed by channel information reconstruction sections 218 #1 to 218 #k are output to a precoding weight generation section 219.

The precoding weight generation section 219 generates precoding weights, which represent the amount of phase and/or amplitude shift for transmission data #1 to #k, based on the PMIs input from channel information reconstruction sections 218 #1 to 218 #k. The generated precoding weights are output to precoding multiplying sections 207 #1 to 207 #k, and used in the precoding of transmission data #1 to transmission data #k.

On the other hand, in the mobile station apparatus 10 illustrated in FIG. 11, transmission signals transmitted from the base station apparatus 20 are received by reception antenna RX #1 to RX #N, electrically separated into the transmission route and the reception route by duplexers 101 #1 to 101 #N, and then output to RF reception circuits 102 #1 to 102 #N. Then, after a frequency conversion process for conversion from radio frequency signals into baseband signals is performed in RF reception circuits 102 #1 to 102 #N, the results are subjected to a Fourier transform in a fast Fourier transform section (FFT section: not shown) and converted from time sequence signals into frequency domain signals. The received signals having been converted into frequency domain signals are output to a data channel signal demodulation section 103.

The data channel signal demodulation section 103 constitutes a demodulation section, and separates the received signals input from the FFT section, by, for example, a maximum likelihood detection (MLD) signal separation method. By this means, the received signals having arrived from the base station apparatus 20 are separated into received signals related to user #1 to user #k, and the received signal related to the user (referred to as "user k" here) of the mobile station apparatus 10 is extracted. A channel estimation section 104 estimates the channel states from the reference signals included in the received signals output from the FFT section, and reports the estimated channel states to the data channel signal demodulation section 103 and to a channel information measurement section 107, which will be described later. The data channel signal demodulation section 103 separates the received signals by the above-described MLD signal separation method, based on the reported channel states.

A DCI format detection section 105 constitutes a detection section and performs blind detection of DCI formats included in the control channel signals (PDCCHs) output from the FFT section. Although the DCI formats included in the control channel signals include the DCI formats for SU-MIMO and MU-MIMO, these are both formed with the same number of bits, so that it is possible to detect DCI formats without increasing the number of searches for blind detection. Then, whether a DCI format is the DCI format for SU-MIMO or the DCI format for MU-MIMO is detected based on the content of the flag indicator included in the DCI format, and information that is included in that DCI format is detected. Then, the detected content is reported to the data channel signal demodulation section 103.

In this case, with the DCI formats included in the PDCCH, the number of bits is set the same between the DCI format for SU-MIMO and the DCI format for MU-MIMO, so that it is possible to decode information of the DCI formats without increasing the number of searches for blind detection. Also, given that a DCI format includes a flag indicator for identifying between SU-MIMO or MU-MIMO, it is possible to identify between the DCI format for SU-MIMO and the DCI format for MU-MIMO.

The data channel signal demodulation section 103 demodulates the extracted received signal related to user k, based on the content of report from the DCI format detection section 105. Note that, prior to the demodulation process by the data channel signal demodulation section 103, the extracted received signal related to user k is demapped in a subcarrier demapping section (not shown) and converted back to a time sequence signal. The received signal that is related to user k and demodulated in the data channel signal demodulation section 103 is output to a channel decoding section 106. Then, as a channel decoding process is performed in the channel decoding section 106, transmission signal #k is reconstructed.

For example, in the event the DCI format for MU-MIMO is detected in the DCI format detection section 105 and DMRS density information is contained in that DCI format, the data channel signal demodulation section 103 is able to recognize the situation of the data channel signals (PDSCHs) puncturing process according to the DMRS density information. Then, by demodulating the data channel signal based on this state of puncturing process, it is possible to prevent collision of the DMRS for the user of the mobile station apparatus 10 and the data channel signal for another mobile station apparatus, and therefore improve the accuracy of channel estimation.

Also, in the event the DCI format for MU-MIMO is detected in the DCI format detection section 105 and DMRS information assigned to another mobile station apparatus is contained in that DCI format, the data channel signal demodulation section 103 is able to recognize the DMRS information for the other mobile station apparatus. Consequently, it is possible to cancel the data channel signal for another mobile station apparatus according to DMRS information assigned to the other mobile station apparatus, so that it is possible to reduce interference with the data channel signal for the other mobile station apparatus.

Furthermore, in the event the DCI format for MU-MIMO is detected in the DCI format detection section 105 and the transmission power ratio of the data channel signals (PDSCHs) and DMRSs is contained in that DCI format, the data channel signal demodulation section 103 is able to recognize the transmission power ratio of the DMRSs with respect to the data channel signals. Consequently, even in the event where the transmission power of DMRSs is amplified in the base station apparatus 20, the mobile station apparatus 10 is able to learn the transmission power ratio of DMRSs and PDSCHs and perform data channel demodulation, so that it is possible to use DMRS transmission power effectively and improve the accuracy of channel estimation in the mobile station apparatus 10.

A channel information measurement section 107 measures channel information from the channel states reported from the channel estimation section 104. To be more specific, the channel information measurement section 107 measures a CQI based on the channel states reported from the channel estimation section 104, selects a PMI to correspond to this, and reports these to a feedback control signal generation section 108.

The feedback control signal generation section 108 generates, based on the reported PMI and CQI, control signals (for example, PUCCHs) to feed back these to the base station apparatus 20. In this case, the control signals to feed back includes feedback information that is based on a control signal (codebook subset restriction) included in upper layer signals (RRC signals). For example, like above method 1 to method 4, control signals including feedback information in which certain limitations are applied to the maximum number of streams and/or the maximum number of codewords per mobile station apparatus 10 are generated. The control signals generated in the feedback control signal generation section 108 are output to the multiplexer (MUX) 109.

Transmission data #k related to user #k and transmitted from an upper layer is subjected to channel coding by a channel coding section 110 and then subjected to data modulation in a data modulation section 111. Transmission data #k having been subjected to data modulation in a data modulation section 111, is subjected to an inverse Fourier transform in a discrete Fourier transform section (not shown) and converted from a time sequence signal to a frequency domain signal, and output to a subcarrier mapping section 112.

The subcarrier mapping section 112 maps transmission data #k to subcarriers in accordance with schedule information designated from the base station apparatus 20. Here, the subcarrier mapping section 112 maps (multiplexes) reference signal #k, having been generated in a reference signal generation section (not shown), to subcarriers, with transmission data #k. Transmission data #k mapped to subcarriers in this way is output to a precoding multiplying section 113.

The precoding multiplying section 113 performs phase and/or amplitude shifting of transmission data #k, for each of reception antennas RX #1 to RX #N, based on the precoding weight corresponding to the PMI selected in the channel information measurement section 107. Transmission data #k, having been subjected to phase and/or amplitude shifting by the precoding multiplying section 113, is output to the multiplexer (MUX) 109.

The multiplexer (MUX) 109 synthesizes transmission data #k having been subjected to phase and/or amplitude shifting, and the control signals generated in the feedback control signal generation section 108, and generates transmission signals for each of reception antennas RX #1 to RX #N. The transmission signals generated by the multiplexer (MUX) 109 are converted from frequency domain signals to time domain signal through an inverse fast Fourier transform, in an inverse fast Fourier transform section (not shown), and then output to RF transmission circuits 114 #1 to 114 #N. Then, after a frequency conversion process for conversion into a radio frequency band is performed in RF transmission circuits 114 #1 to 114 #N, the results are output to reception antennas RX #1 to RX #N, through duplexers 101 #1 to 101 #N, and transmitted to the base station apparatus 20 on the uplink from reception antennas RX #1 to RX #N.

In the mobile communication system 1 according to the present embodiment, control signals (PDCCHs) to be transmitted from the base station apparatus 20 to the mobile station apparatus 10 include the DCI formats for SU-MIMO and MU-MIMO having the same number of bits. Given that the DCI formats for SU-MIMO and MU-MIMO included in control signals are set with the same number of bits in this way, it is possible to detect information of the DCI formats, without increasing the number of searches for blind detection in the DCI format detection section 105 in the mobile station apparatus 10.

Then, given that the DCI formats detected by the DCI format detection section 105 contain identification information (flag indicators) to identify between the DCI format for SU-MIMO and the DCI format for MU-MIMO, it is possible to identify between the DCI formats for SU-MIMO and for MU-MIMO reliably, so that it is possible to switch dynamically between SU-MIMO and MU-MIMO in accordance with the content of the flag indicators.

Also, in the mobile communication system 1 according to the present embodiment, information to be contained in the DCI format for MU-MIMO is removed by applying certain limitations to the maximum number of streams and/or the maximum number of codewords per mobile station apparatus 10 in the event MU-MIMO transmission is performed. To be more specific, the maximum number of streams and/or the maximum number of codewords per mobile station apparatus 10 is limited by one of above method 1 to method 4. For example, in the event of limiting the maximum number of streams per mobile station apparatus 10 to two streams by method 1, it is possible to remove rank information, which represents the number of transmitting streams, in the DCI format. By this means, it is possible to add MU-MIMO-specific information to the DCI field from which the rank information has been removed.

Furthermore, in mobile communication system 1 according to the present embodiment, in a DCI field, from which information is removed, in the DCI format for MU-MIMO, it is possible to add at least one of DMRS density information, DMRS information assigned to a mobile station apparatus other than the mobile station apparatus 10 to be the target of communication (that is, another mobile station apparatus), and the transmission power ratio of data channel signals (PDSCHs) and DMRSs. By this means, without increasing the number of bits in the DCI format for MU-MIMO, it is possible to improve the accuracy of channel estimation in the mobile station apparatus 10 and reduce interference that is produced from and against another mobile station apparatus.

For example, in the event DMRS density information is added, it is possible to recognize the state of the data channel signal (PDSCH) puncturing process, in the mobile station apparatus 10, in accordance with the DMRS density information. Then, by demodulating transmission data adequately from the recognition result, it is possible to prevent collision of DMRSs for the mobile station apparatus 10 and PDSCHs for another mobile station apparatus, and consequently improve the accuracy of channel estimation in the mobile station apparatus 10. Also, in the event DMRS information assigned to another mobile station apparatus is added, it is possible to cancel transmission data (data channel signal) for the other mobile station apparatus in accordance with the DMRS information assigned to the other mobile station apparatus, so that it is possible to reduce interference with transmission data for the other mobile station apparatus. Furthermore, in the event the transmission power ratio of data channel signals (PDSCHs) and DMRSs is added, even when the DMRS transmission power is amplified in the base station apparatus 20, the mobile station apparatus 10 is able to learn the transmission power ratio of DMRSs and PDSCHs and perform data channel demodulation, so that it is possible to use DMRS transmission power efficiently, and improve the accuracy of channel estimation in the mobile station apparatus 10.

Note that, although embodiments have been described above where, in order to identify between SU-MIMO and MU-MIMO, a flag indicator is added to part of the DCI field in a DCI format. By contrast with this, in the event of masking part of the DCI field in a DCI format by a unique user identifier (UE-ID) for identifying between SU-MIMO and MU-MIMO, it is possible to select between the DCI formats for SU-MIMO and MU-MIMO by selecting the user identifier (user identifier for SU-MIMO or MU-MIMO) for masking the CRC code in the DCI selection section 209 of the base station apparatus 20. On the other hand, by reconstructing the CRC code by using the user identifier (the user identifier for SU-MIMO or MU-MIMO) in the DCI format detection section 105 of the mobile station apparatus 10, it is possible to detect the DCI format for SU-MIMO or MU-MIMO. Like these, implementation by way of changing the processes in components related to the selection and detection of DCI formats, is possible.

Now, although the present invention has been described in detail with reference to the above embodiments, it should be obvious to a person skilled in the art that the present invention is by no means limited to the embodiments described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

The disclosure of Japanese Patent Application No. 2010-001348, filed on Jan. 6, 2010, including the specification, drawings, and abstract, is incorporated herein by reference in its entirety.

The invention claimed is:

1. A base station apparatus comprising:
an identification information selection section configured to select identification information which identifies between a DCI format for SU-MIMO and a DCI format for MU-MIMO;
a control signal generation section configured to generate a control signal including the DCI format for SU-MIMO or MU-MIMO, including the identification information and having a same number of bits when the amount of information to be defined in the DCI format varies between SU-MIMO and MU-MIMO; and
a transmission section configured to transmit the control signal to a mobile station apparatus,
wherein the control signal generation section makes the number of bits the same between the DCI formats for SU-MIMO and MU-MIMO by adding MU-MIMO-specific information to a DCI field in the DCI format for MU-MIMO.

2. The base station apparatus according to claim 1, wherein the control signal generation section adds the identification information to part of the DCI field.

3. The base station apparatus according to claim 1, wherein the control signal generation section masks part of the DCI field by the identification information.

4. The base station apparatus according to claim 1, wherein, upon generating a control signal to include the DCI format for MU-MIMO, the control signal generation section removes information in the DCI field corresponding to at least one of a number of streams and a number of code words per mobile station apparatus to be a target of communication.

5. The base station apparatus according to claim 4, wherein the control signal generation section limits an upper limit value of the maximum number of streams per mobile station apparatus to be the target of communication to two streams, and removes information in the DCI field corresponding to the number of streams per mobile station apparatus.

6. The base station apparatus according to claim 5, wherein the control signal generation section limits an upper limit value of a maximum number of codewords per mobile station apparatus to be the target of communication to one codeword, and removes information in the DCI field corresponding to the number of codewords per mobile station apparatus.

7. The base station apparatus according to claim 4, wherein the control signal generation section limits an upper limit value of the maximum number of streams per mobile station apparatus to be the target of communication to one stream, and removes information in the DCI field corresponding to the number of streams per mobile station apparatus.

8. The base station apparatus according to claim 7, wherein the control signal generation section limits an upper limit value of the maximum number of codewords per mobile station apparatus to be the target of communication to one codeword, and removes information in the DCI field corresponding to the number of codewords per mobile station apparatus.

9. The base station apparatus according to claim 4, wherein the control signal generation section limits an upper limit value of the maximum number of codewords per mobile station apparatus to be the target of communication to one codeword, and removes information in the DCI field corresponding to the number of codewords per mobile station apparatus.

10. The base station apparatus according to claim 4, wherein the control signal generation section adds density information of demodulate reference signals to the DCI field that is removed in the DCI format for MU-MIMO.

11. The base station apparatus according to claim 4, wherein the control signal generation section adds information related to a demodulate reference signal for a mobile station apparatus other than the mobile station apparatus to be the target of communication, to the DCI field that is removed in the DCI format for MU-MIMO.

12. The base station apparatus according to claim 4, wherein the control signal generation section adds a transmission power ratio of a data channel signal and a demodulate reference signal, to the DCI field that is removed in the DCI format for MU-MIMO.

13. A mobile station apparatus comprising:
a receiving section configured to receive, from a base station apparatus, a control signal including a DCI format for SU-MIMO or MU-MIMO, including identification information which identifies between the DCI format for SU-MIMO and the DCI format for MU-MIMO and having a same number of bits when the amount of information to be defined in the DCI format varies between SU-MIMO and MU-MIMO, and the number of bits is made the same between the DCI formats for SU-MIMO and MU-MIMO by adding MU-MIMO-specific information to a DCI field in the DCI format for MU-MIMO; and
a detection section configured to detect a type of the DCI format included in the control signal based on the identification information, and detect information that is included in the DCI format.

14. The mobile station apparatus according to claim 13, wherein the detection section identifies the identification information added to part of the DCI field and detects the type of the DCI format included in the control signal.

15. The mobile station apparatus according to claim 14, further comprising a demodulation section configured to demodulate a data channel signal received from a base station apparatus,
  wherein the demodulation section demodulates the data channel signal based on density information of demodulate reference signals included in the DCI format.

16. The mobile station apparatus according to claim 13, wherein the detection section reconstructs the masked identification information in part of the DCI field and detects the type of the DCI format included in the control signal in accordance with the reconstructed identification information.

17. The mobile station apparatus according to claim 16, further comprising a demodulation section configured to demodulate a data channel signal received from a base station apparatus,
  wherein the demodulation section demodulates the data channel signal based on density information of demodulate reference signals included in the DCI format.

18. The mobile station apparatus according to claim 13, further comprising a demodulation section configured to demodulate a data channel signal received from a base station apparatus,
  wherein the demodulation section demodulates the data channel signal based on density information of demodulate reference signals included in the DCI format.

19. The mobile station apparatus according to claim 13, further comprising a demodulation section configured to demodulate a data channel signal received from a base station apparatus,
  wherein the demodulation section demodulates the data channel signal based on a demodulate reference signal assigned to a mobile station apparatus other than the mobile station apparatus, included in the DCI format.

20. The mobile station apparatus according to claim 13, further comprising a demodulation section configured to demodulate a data channel signal received from a base station apparatus,
  wherein the demodulation section demodulates the data channel signal based on a transmission power ratio of the data channel signal and a demodulate reference signals, included in the DCI format.

21. A control information transmission method comprising the steps of:
  at a base station apparatus:
    selecting identification information which identifies between a DCI format for SU-MIMO and a DCI format for MU-MIMO;
    generating a control signal including the DCI format for SU-MIMO or MU-MIMO, including the identification information and having a same number of bits when the amount of information to be defined in the DCI format varies between SU-MIMO and MU-MIMO, and the number of bits is made the same between the DCI formats for SU-MIMO and MU-MIMO by adding MU-MIMO-specific information to a DCI field in the DCI format for MU-MIMO; and
    transmitting the control signal; and
  at a mobile station apparatus:
    receiving the control signal; and
    detecting a type of the DCI format included in the control signal based on the identification information, and detecting information that is included in the DCT format.

* * * * *